United States Patent
Jeong et al.

(10) Patent No.: US 8,838,446 B2
(45) Date of Patent: Sep. 16, 2014

(54) METHOD AND APPARATUS OF TRANSFORMING SPEECH FEATURE VECTORS USING AN AUTO-ASSOCIATIVE NEURAL NETWORK

(75) Inventors: So-young Jeong, Seoul (KR);
Kwang-cheol Oh, Yongin-si (KR);
Jae-hoon Jeong, Yongin-si (KR);
Jeong-su Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 807 days.

(21) Appl. No.: 11/896,450

(22) Filed: Aug. 31, 2007

(65) Prior Publication Data

US 2008/0147391 A1 Jun. 19, 2008

(30) Foreign Application Priority Data

Dec. 15, 2006 (KR) .................. 10-2006-0128941

(51) Int. Cl.
*G10L 15/02* (2006.01)
*G10L 15/16* (2006.01)
*G10L 15/20* (2006.01)
*G10L 25/30* (2013.01)

(52) U.S. Cl.
CPC ............. *G10L 15/02* (2013.01); *G10L 15/16* (2013.01); *G10L 15/20* (2013.01); *G10L 25/30* (2013.01)
USPC ................ 704/232; 704/259; 704/202

(58) Field of Classification Search
CPC .................... G10L 15/02; G10L 15/16
USPC ....................... 704/232, 259, 202
See application file for complete search history.

(56) References Cited

U.S. PATENT DOCUMENTS

| | | | |
|---|---|---|---|
| 5,175,793 A | 12/1992 | Sakamoto et al. | |
| 5,185,848 A * | 2/1993 | Aritsuka et al. | 704/202 |
| 5,408,588 A * | 4/1995 | Ulug | 706/25 |
| 5,749,066 A * | 5/1998 | Nussbaum | 704/232 |
| 5,751,904 A * | 5/1998 | Inazumi | 704/232 |
| 6,026,358 A | 2/2000 | Tomabechi | 704/232 |
| 6,401,082 B1 * | 6/2002 | Kropas-Hughes et al. | 706/26 |
| 6,907,412 B2 | 6/2005 | Pao et al. | |
| 2003/0225577 A1 | 12/2003 | Deng et al. | |
| 2004/0002928 A1 * | 1/2004 | Huang | 706/20 |
| 2004/0172238 A1 * | 9/2004 | Choo et al. | 704/202 |

FOREIGN PATENT DOCUMENTS

| | | |
|---|---|---|
| JP | 2-135500 | 5/1990 |
| JP | 6-102899 | 4/1994 |
| JP | 6-266397 | 9/1994 |
| JP | 2002-509303 | 3/2002 |
| JP | 2005-527002 | 9/2005 |
| KR | 1999-0049492 | 7/1999 |

OTHER PUBLICATIONS

Sharma et al. "Feature extraction using non-linear transformation for robust speech recognition on the Aurora database", IEEE, ICASSP 2000.*

(Continued)

*Primary Examiner* — Jialong He
(74) *Attorney, Agent, or Firm* — Staas & Halsey LLP

(57) ABSTRACT

Provided is a method and apparatus for transforming a speech feature vector. The method includes extracting a feature vector required for speech recognition from a speech signal and transforming the extracted feature vector using an auto-associative neural network (AANN).

15 Claims, 10 Drawing Sheets

(56) References Cited

OTHER PUBLICATIONS

Bourlard et al. "Auto-association by multilayer perceptrons and singular value decomposition", Biol. Cybern, vol. 59, pp. 291-294, published by Springer-Verlag, 1988.*

Lerner et al. "A comparative study of neural network based feature extraction paradigms", Pattern recognition letters, published by Elsevier, 1999.*

Yegnanarayana et al. "Source and system features for speaker recognition using AANN models", IEEE, ICASSP 2001.*

Mao et al. "Artificial Neural Networks for Feature Extraction and Multivariate Data Projection", IEEE Transactions on Nelral Networks. vol. 6. No. 2. Mar. 1995.*

Schwarz, "Towards Lower Error Rates in Phoneme Recognition", In Proc. of 7th Intl. Conf. on Text, Speech and Dialogue, No. ISBN 3-540-23049-1 in Springer, p. 8, 2004.*

Hilger, F. et al., *Quantile Based Histogram Equalization for Noise Large Vocabulary Speech Recognition*, IEEE Trans, Audio, Speech, Language Processing, vol. 14, No. 3, pp. 845-854 (10 pages).

Hung, J. et al., *Optimization of Temporal Filters for Constructing Robust Features in Speech Recognition*, IEEE Trans. Audio, Speech and Language Processing, vol. 14, No. 3, 2006, pp. 808-832 (25 pages).

Li, J. et al., *A Study on Knowledge Source Integration for Candidate Rescoring in Automatic Speech Recognition*, ICASSP, 2006, pp. 837-840 (4 pages).

Di Martino, J. et al., *On the Use of High Order Derivatives for High Performance Alphabet Recognition*, ICASSP, 2002, pp. 953-956 (4 pages).

Pujol, P. et al., *On Real-Time Mean-Variance Normalization of Speech Recognition Features*, ICASSP, 2006, pp. 773-776 (4 pages).

Shire, M. et al., *Data-Driven RASTA Filters in Reverberation*, ICASSP, 2000, pp. 1627-1630 (4 pages).

Barry Chen et al., "Learning Discriminative Temporal Patterns in Speech: Development of Novel TRAPS-Like Classifiers", EUROSPEECH 2003, pp. 853-856.

Hermansky, H. et al., *Temporal Patterns in ASR of Noisy Speech*, ICASSP, 1999, pp. 289-292 (4 pages).

Japanese Office Action issued Jul. 3, 2012 in corresponding Japanese Patent Application No. 2007-323737.

Japanese Office Action issued Jul. 23, 2013 in corresponding Japanese Application No. 2007-323737.

Japanese Office Action issued Jul. 3, 2012 in corresponding Japanese Application No. 2007-323737.

Korean Notice of Allowance issued May 29, 2009 in corresponding Korean Application No. 10-2006-0128941.

Nonlinear Principal Component Analysis Using Autoassociative Neural Network, Mark A. Kramer, Aiche Journal, vol. 37, No. 2, 1991, pp. 233-243.

Nathalie Japkowicz et al., Nonlinear Autoassociation Is Not Equivalent to PCA, Neura Computation, vol. 12, No. 3, Mar. 2000, pp. 1-23.

Martin Riedmiller et al., A Direct Adaptive Method for Faster Backpropagation Learning: The RPROP Algorithm, International Conference on Neural Networks, 1993, pp. 586-591.

\* cited by examiner

METHOD AND APPARATUS OF TRANSFORMING SPEECH FEATURE VECTORS USING AN AUTO-ASSOCIATIVE NEURAL NETWORK

CROSS-REFERENCE TO RELATED PATENT APPLICATION

This application claims the benefit of Korean Patent Application No. 10-2006-0128941, filed on Dec. 15, 2006, in the Korean Intellectual Property Office, the disclosure of which is incorporated herein in its entirety by reference.

BACKGROUND OF THE INVENTION

1. Field of the Invention

The present invention relates to a method of and apparatus for transforming a speech feature vector, and more particularly, to a method of and apparatus for transforming speech feature vectors using an auto-associative neural network (AANN).

2. Description of the Related Art

Although the application fields of speech recognition technology have expanded to information electronic appliances, computers, and high-density telephony servers, the variation of recognition performance with surrounding factors obstructs further expansion of the speech recognition technology to practical uses.

To address the variation of speech recognition performance caused by surrounding noise, much research has been conducted on techniques for linearly or non-linearly transforming a conventional mel-frequency cepstral coefficient (MFCC) feature vector based on the temporal characteristics of a speech feature vector during a speech feature vector extraction process, which is the first stage in speech recognition.

For example, conventional transformation algorithms based on the temporal characteristics of a feature vector, such as cepstral mean subtraction and mean-variance normalization, were disclosed in "On Real-Time Mean-Variance Normalization of Speech Recognition Features (ICASSP, 2006, pp. 773-776)" by P. Pujol, D, Macho and C. Nadeu, a relative spectral algorithm (RASTA) was disclosed in "Data-Driven RASTA Filters in Reverberation (ICASSP, 2000, pp. 1627-1630)" by M. L. Shire et al., histogram normalization was disclosed in "Quantile Based Histogram Equalization for Noise Large Vocabulary Speech Recognition (IEEE Trans, Audio, Speech, Language Processing, vol. 14, no. 3, pp. 845-854)" by F. Hilger and H. Ney, and an augmenting delta feature algorithm was disclosed in "On the Use of High Order Derivatives for High Performance Alphabet Recognition (ICASSP, 2002, pp. 953-956)" by J. di Martino.

Techniques for linearly transforming feature vectors, such as methods for transforming feature data in a temporal frame using linear discriminant analysis (LDA) and principal component analysis (PCA), were disclosed in "Optimization of Temporal Filters for Constructing Robust Features in Speech Recognition (IEEE Trans. Audio, Speech and Language Processing, vol. 14, No. 3, 2006, pp. 808-832)" by Jeih-Weih Hung et al.

Techniques using a non-linear neural network, such as a temporal pattern (TRAP) algorithm, were disclosed in "Temporal Patterns in ASR of Noisy Speech (ICASSP, 1999, pp. 289-292)" by H. Hermansky and S. Sharma, and automatic speech attribute transcription (ASAT) was disclosed in "A Study on Knowledge Source Integration for Candidate Rescoring in Automatic Speech Recognition (ICASSP, 2006, pp. 837-840)" by Jinyu Li, Yu Tsao, and Chin-Hui Lee.

FIG. 1 is a block diagram of feature vector transformation using a TRAP algorithm according to the prior art.

Referring to FIG. 1, a log critical-band energy feature vector 100 extracted from a speech signal passes through preprocessors 105 and 115 corresponding to each band and then the log critical-band energy feature vector 100 passes through a nonlinear network of multi-layer perceptrons (MLPs) 110 and 120, thereby being transformed into a feature vector used in a recognition apparatus. A target value of each of the MLPs 110 and 120 corresponding to each band is given by a phonemic class of a transformation frame. For example, when 39 phonemes are recognized, a target value of output neurons of an MLP corresponding to each band is set to 1 for an output neuron having only a phonemic class corresponding to a transformation frame among the 39 phonemes and is set to −1 for the other output neurons. In other words, phonemic class information for each frame is given as a target value. Each of the MLPs 110 and 120 corresponding to each band has 39 output values that are input to an integrated MLP 130. A target value of the integrated MLP 130 is also set using phonemic class information of a transformation frame like a target value of an MLP corresponding to each band. Such TRAP speech feature transformation sufficiently reflects a longer temporal correlation than a conventional MFCC feature vector, but is available only when phonemic class information for each frame is previously provided.

In general, a speech database has no phonemic class information for each frame. As a result, for the application of the TRAP algorithm, a recognition model is formed using a conventional MFCC feature vector and phoneme transcription is performed for each frame in a forced alignment manner. However, the recognition model may have an error, which means that an error would likely occur in phoneme transcription for each frame. For this reason, there is a high probability that a neural network of the TRAP algorithm learn wrong target values.

FIG. 2 is a block diagram of a feature vector transformation using an ASAT algorithm according to the prior art.

Like the TRAP algorithm illustrated in FIG. 1, the ASAT algorithm generates a feature vector through a two-stage non-linear neural network of MLPs. Unlike the TRAP algorithm illustrated in FIG. 1 that uses an MLP corresponding to each band, adjacent frame vectors 200 are input to the neural network and a target value of first-stage MLPs 210 and 215 has phonemic class information of a transformation frame. In other words, phonemes are classified into 15 classes of vowel, stop, fricative, approximant, nasal, low, mid, high, dental, labial, coronal, palatal, velar, glottal, and silence and a target value corresponding to the phonemic class of the transformation frame is set. A result from the first-stage MLPs 210 and 215 is input to a second-stage integrated MLP 220 and a target value of the integrated MLP 220 is set to a phoneme of the transformation frame.

Thus, like the TRAP algorithm illustrated in FIG. 1, feature vectors of the ASAT algorithm also output a phoneme target value for each frame like the TRAP algorithm illustrated in FIG. 1 and phonemic information of each frame is required for learning of the neural network.

SUMMARY OF THE INVENTION

The present invention provides a method of and apparatus for transforming a speech feature vector, by which robust feature output values can be obtained even when a speech feature vector contaminated by noise during speech recognition is input.

According to one aspect of the present invention, there is provided a method of transforming a speech feature vector. The method includes extracting a feature vector required for speech recognition from a speech signal and transforming the extracted feature vector using an auto-associative neural network (AANN).

According to another aspect of the present invention, there is provided a method of transforming a speech feature vector. The method includes extracting a feature vector required for speech recognition from a speech signal, inputting the extracted feature vector and a feature vector of an adjacent frame of the extracted feature vector to an auto associative neural network (AANN), and extracting an output value of a hidden layer of the AANN.

According to another aspect of the present invention, there is provided an apparatus for transforming a speech feature vector. The apparatus includes a feature extraction unit extracting a feature vector required for speech recognition from a speech signal and a feature transformation unit transforming the extracted feature vector using an auto-associative neural network (AANN).

According to another aspect of the present invention, there is provided a computer-readable recording medium having recorded thereon a program for implementing the above methods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
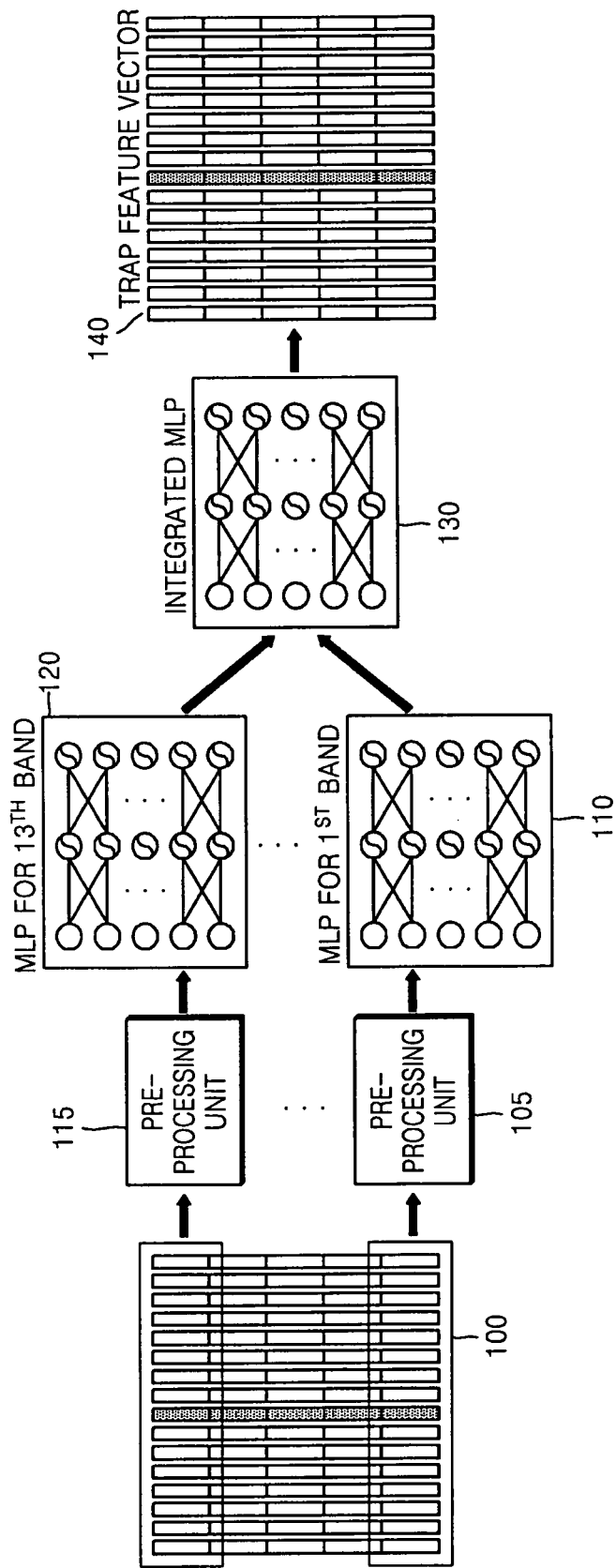
FIG. 1 is a block diagram of feature vector transformation using a temporal pattern (TRAP) algorithm according to the prior art.
Figure 2:
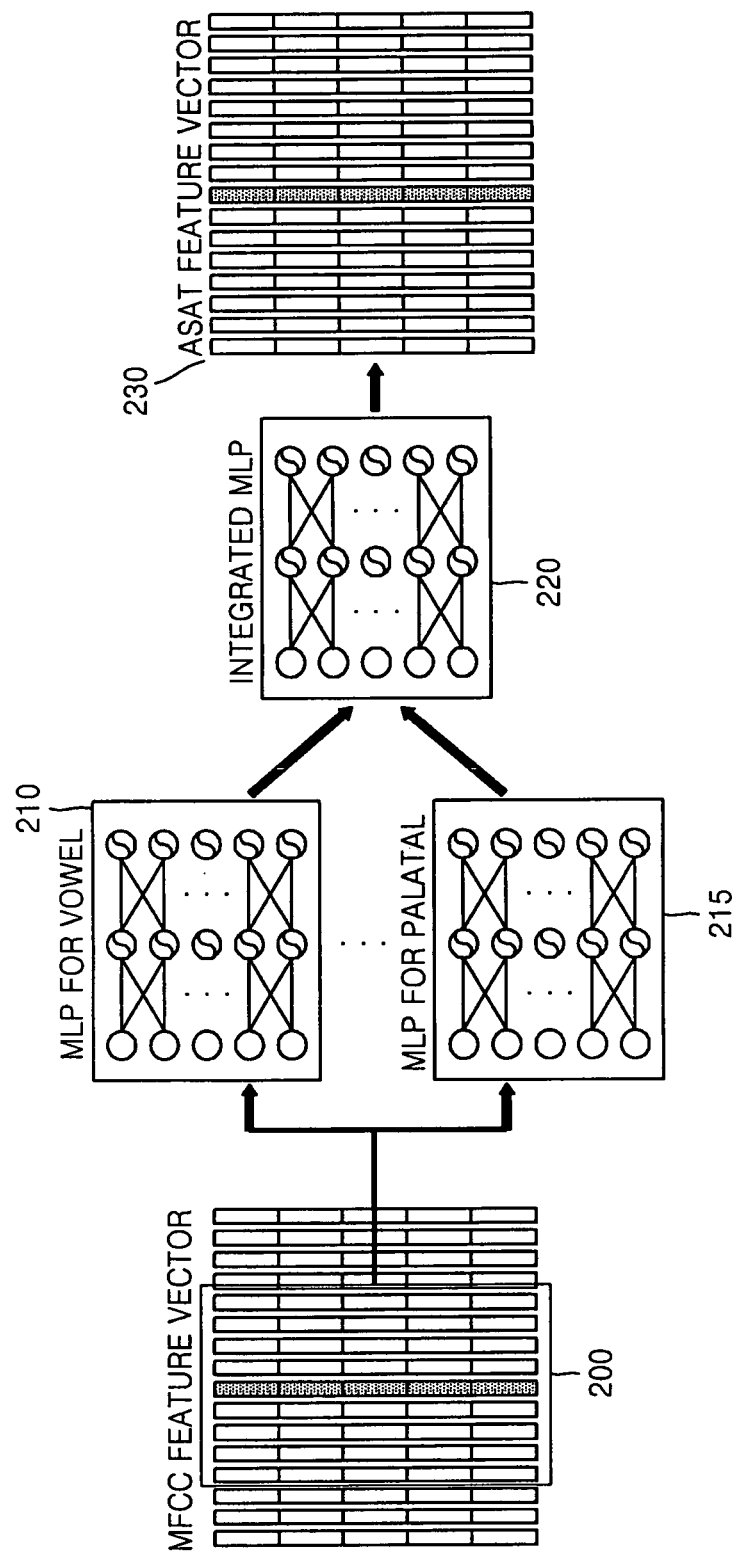
FIG. 2 is a block diagram of feature vector transformation using an automatic speech attribute transcription (ASAT) algorithm according to the prior art.
Figure 3:
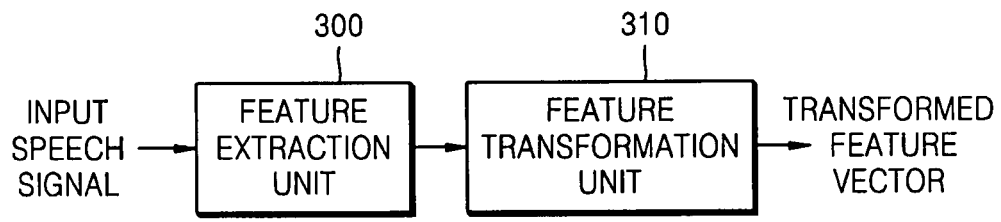
FIG. 3 is a block diagram of an apparatus for transforming a speech feature vector using an auto-associative neural network (AANN) according to an exemplary embodiment of the present invention.

FIG. 3 is a block diagram of an apparatus for transforming a speech feature vector using an auto-associative neural network (AANN) according to an exemplary embodiment of the present invention.

Referring to FIG. 3, the apparatus includes a feature extraction unit 300 and a feature transformation unit 310.

In general, a speech recognition apparatus receives a speech signal and outputs a recognition result, in which a feature that allows the speech recognition apparatus to identify each recognition component is referred to as a feature vector and the speech signal itself may be used as the feature vector. However, since most speech signals include unnecessary information for recognition, only components required for the recognition are extracted as the feature vector.

The feature extraction unit 300 receives a speech signal and extracts a feature vector. The extracted feature vector has compressed components required for recognition among the entire components of the speech signal and usually has frequency information over time.

The feature vector may be a mel-frequency cepstral coefficient (MFCC), a linear prediction cepstral coefficient (LPCCs), and an ensemble interval histogram (EIH). In an exemplary embodiment of the present invention, the MFCC is used as the feature vector.

To extract the feature vector from the speech signal, the feature extraction unit 300 may perform various preprocessing operations such as constructing a frame unit, a Hamming window operation, Fourier transformation, a filter bank operation, cepstral transformation, and the like, as will be described later with reference to FIG. 4.

The feature transformation unit 310 transforms the extracted feature vector using a neural network based non-linear transformation algorithm. In an exemplary embodiment of the present invention, the feature transformation unit 310 transforms the extracted feature vector using the AANN and uses the transformed feature vector as an input to the speech recognition apparatus. Feature vector transformation using the AANN will be described with reference to FIG. 4.

Optionally, a delta feature or an acceleration feature may be extracted from the feature vector transformed using the AANN.

Figure 4:
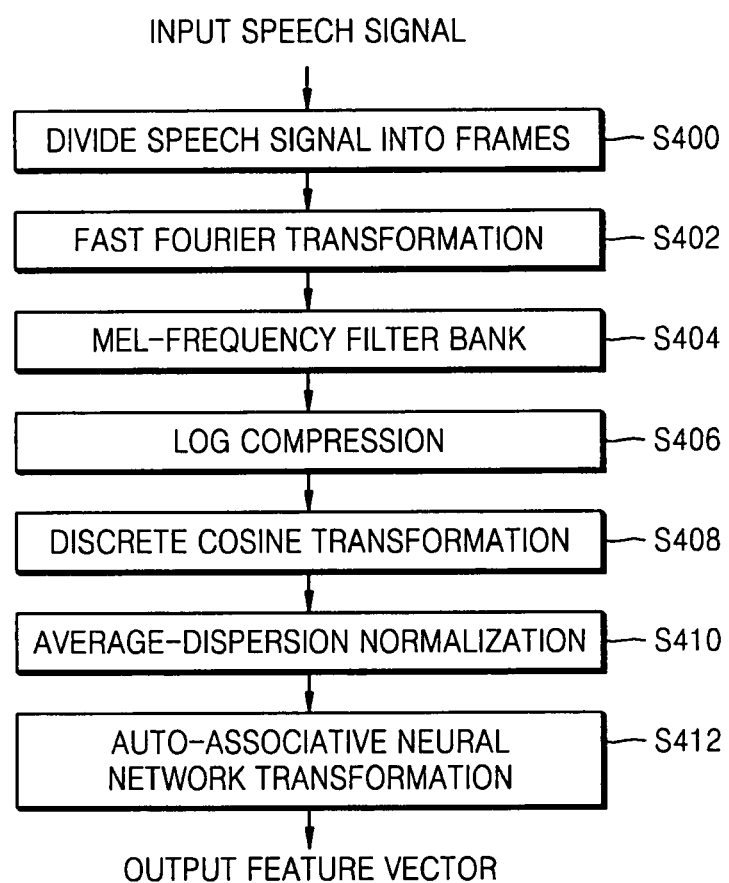
FIG. 4 is a flowchart of a method of transforming a speech feature vector using an AANN according to another exemplary embodiment of the present invention.

FIG. 4 is a flowchart of a method of transforming a speech feature vector using an AANN according to another exemplary embodiment of the present invention.

A speech signal passes through an anti-aliasing filter and undergoes analog-to-digital (A/D) conversion, thereby being transformed into a digital signal. The digital signal is preprocessed when passing through a digital pre-emphasis filter having a high-pass feature.

In operation S400, the speech signal is divided into frames of a predetermined size. Here, a Hamming window is applied to the pre-emphasis filtered signal to obtain block-based frames. The Hamming window compensates for discontinuity that may occur when the speech signal is divided into frame units. Here, a frame size is generally 20-30 ms, and preferably, 30 ms.

In operation S402, a speech signal of a frame is transformed into a frequency domain using fast Fourier transformation, thereby obtaining spectrum size information.

In operation S404, a feature vector corresponding to each band is obtained using a mel-frequency filter bank 230 imitating an auditory model. A method for setting a filter bank shape and a center frequency is determined based on auditory characteristics, i.e., frequency characteristics in a cochlea. In operation 406, the feature vector corresponding to each band is compressed using a log function.

In operation S408, discrete cosine transformation (DCT) is performed to reduce correlations between feature vectors corresponding to each band.

In operation S410, an MFCC feature vector that is robust against noise and a channel change is obtained using average-dispersion transformation for each band. Preferably, 12 coefficients c1-c12 are used as the MFCC feature vector, a frame log energy is additionally used as the MFCC feature vector, and thus a 13-order feature vector is used as an input to a speech recognition apparatus.

In operation S412, an AANN is applied to the MFCC feature vector generated through operations S400 through S410, thereby outputting a feature vector that is robust and contains adjacent time-frame vector information.

Hereinafter, the AANN will be described in detail.

The AANN is a technique for transforming high-dimensional multivariable data to minimum-dimensional data while minimizing an information loss by removing correlations between input variables. This technique has been used to reduce distortion in overlapping images and the dimension of non-linear data. Unlike principal component analysis (PCA) that is a conventional linear transformation algorithm, the AANN uses a nonlinear hidden neuron layer, thus being efficient in nonlinear data reduction.

The AANN is composed of 5 layers: an input layer, a mapping layer, a hidden layer, a demapping layer, and an output layer. The input layer receives M-dimensional data having correlation with one another. The demapping layer includes an L-dimensional neuron for compressing input M-dimensional data to F-dimensional feature data, in which F is lower than N. The input-output characteristic of the demapping layer can be expressed as follows.

$$F=G(X) \quad (1),$$

where G indicates a vector having a function for activating the L-dimensional neuron of the demapping layer as its element, X indicates a 1×M-dimensional measurement variable, and F indicates compressed 1×F-dimensional data. Compression from M-dimensional input data to F-dimensional data is possible using this input-output characteristic, and the compressed data can be obtained through an output of the hidden layer.

The demapping layer is composed of L neurons for reconstructing the original 1×M data from compressed 1×F-dimensional data and has a characteristic as follows.

$$Y=H(F) \quad (2),$$

where H indicates a vector having a function for activating the L-dimensional neuron of the demapping layer as its element and Y indicates output 1×M-dimensional data that is the same as that used as an input to the AANN. In Equations 1 and 2, G and H for activating the L-dimensional neuron of the demapping layer include coupling strengths to be adjusted during learning and learn in such a way to minimize a residual expressed by Equation 3 using supervised learning.

$$R=X-Y \quad (3)$$

To sum up, speech feature vector transformation using the AANN generates a feature vector by performing MFCC feature vector extraction and operations S400 through S412.

Optionally, after operation S412, a final feature vector to be input to the speech recognition apparatus may be generated by extracting a delta-t feature or an acceleration feature from a transformed feature vector.

Figure 5:
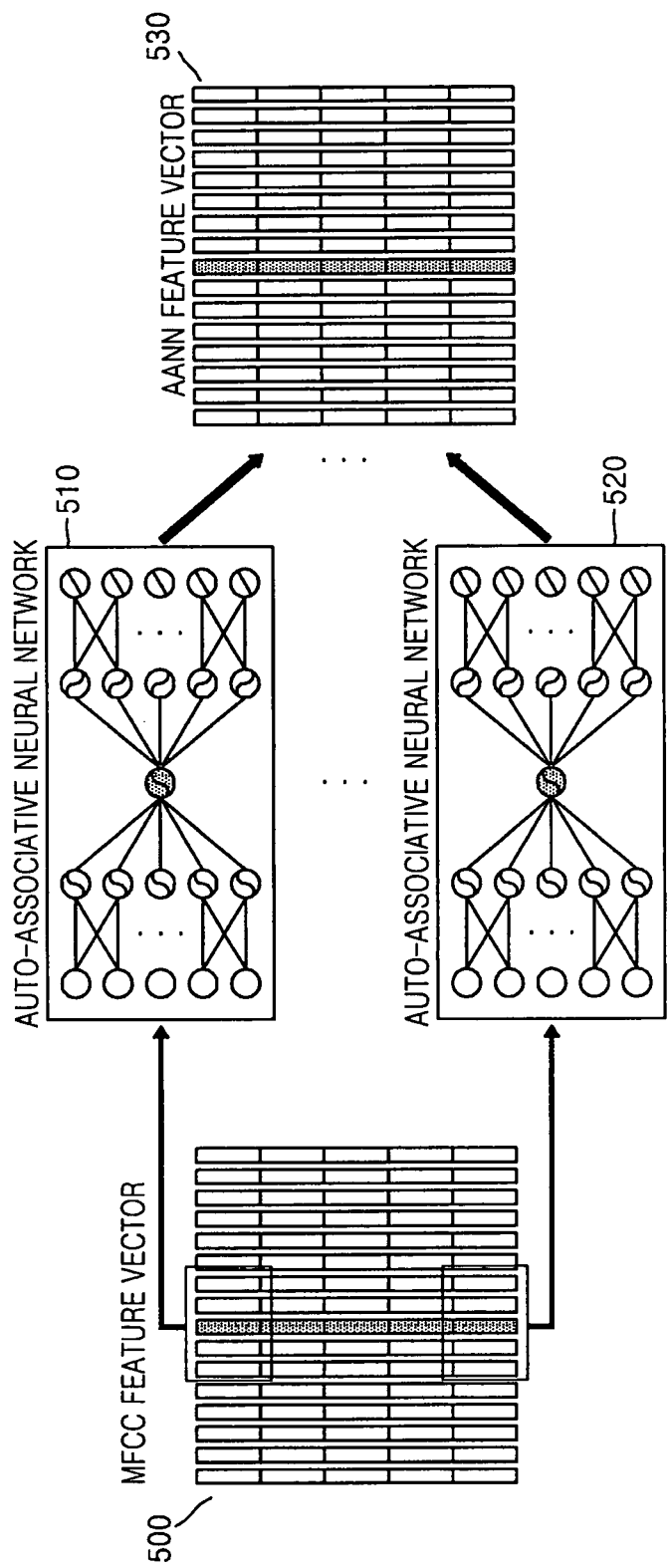
FIG. 5 is a view for explaining transformation of feature vectors of a mel-frequency cepstral coefficient (MFCC) using an AANN according to another exemplary embodiment of the present invention.

FIG. 5 is a view for explaining transformation of feature vectors of an MFCC using an AANN according to another exemplary embodiment of the present invention.

Referring to FIG. 5, an MFCC feature vector 500, AANNs 510 and 520, and an AANN feature vector 530 are shown.

In the MFCC feature vector 500, a horizontal direction indicates a temporal frame and a vertical direction indicates a vector order of each frame. Here, frames adjacent to a transformation frame are used as inputs to the AANNs 510 and 520 for each frequency band and are also used for outputs of the AANNs 510 and 520 for learning.

An AANN generally has three hidden neuron layers, in which an intermediate hidden layer has a smaller number of concealment neurons than input neurons, thereby reducing the dimension of an input vector.

In FIG. 5, the intermediate hidden layer includes one concealment neuron. 5 adjacent frames of the MFCC feature vector 500 are input to the AANN 510 and the AANN 520 for each band and thus an AANN for each band becomes to have a 5-5-1-5-5 structure. Results of the intermediate hidden neuron layer of the AANN for each band are extracted and are used as the AANN feature vector 530 of the transformation frame.

Figure 6:
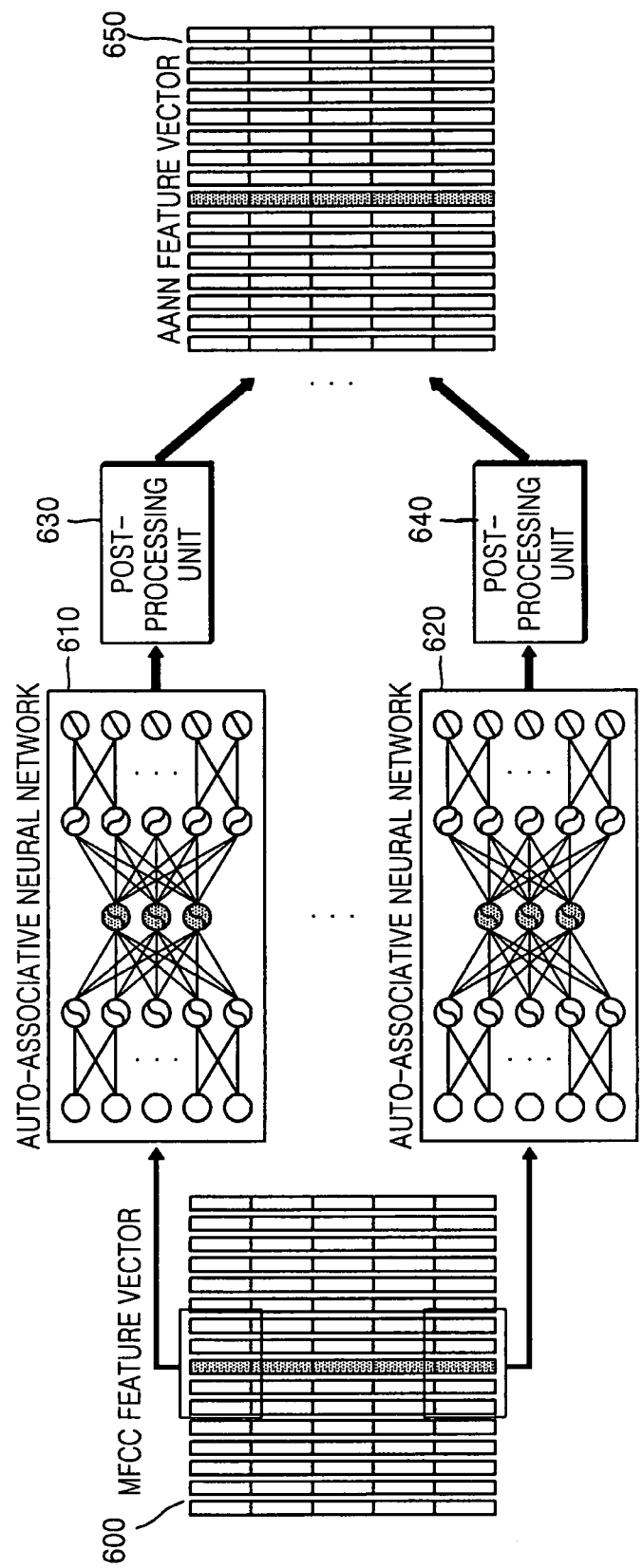
FIG. 6 is a view for explaining transformation of feature vectors using an AANN having multiple concealment neurons according to another exemplary embodiment of the present invention.

FIG. 6 is a view for explaining a transformation of feature vectors using an AANN having multiple hidden neurons according to another exemplary embodiment of the present invention.

Referring to FIG. 6, an MFCC feature vector 600, AANNs 610 and 620, post-processing units 630 and 640, and an AANN feature vector 650 are shown.

In FIG. 6, the AANNs 610 and 620 having multiple hidden neurons are used instead of the AANNs 510 and 520 illustrated in FIG. 5. In other words, the MFCC feature vector 600 for each frame passes through the AANNs 610 and 620, each having three neurons in its intermediate hidden neuron layer, unlike the AANNs 510 and 520, each having one neuron in its intermediate hidden neuron layer. The values of input neurons are transformed to output values of three hidden neurons through AANN learning.

Each of the post-processing units 630 and 640 transforms the extracted outputs of the three hidden neuron layers to an average of or the maximum value among the outputs. The outputs of the post-processing units 630 and 640 are used as the AANN feature vector 650.

Like in FIG. 5, when 5 adjacent frames of the MFCC feature vector 600 are used, each of the AANNs 610 and 620 has a 5-5-3-5-5 structure.

Figure 7:
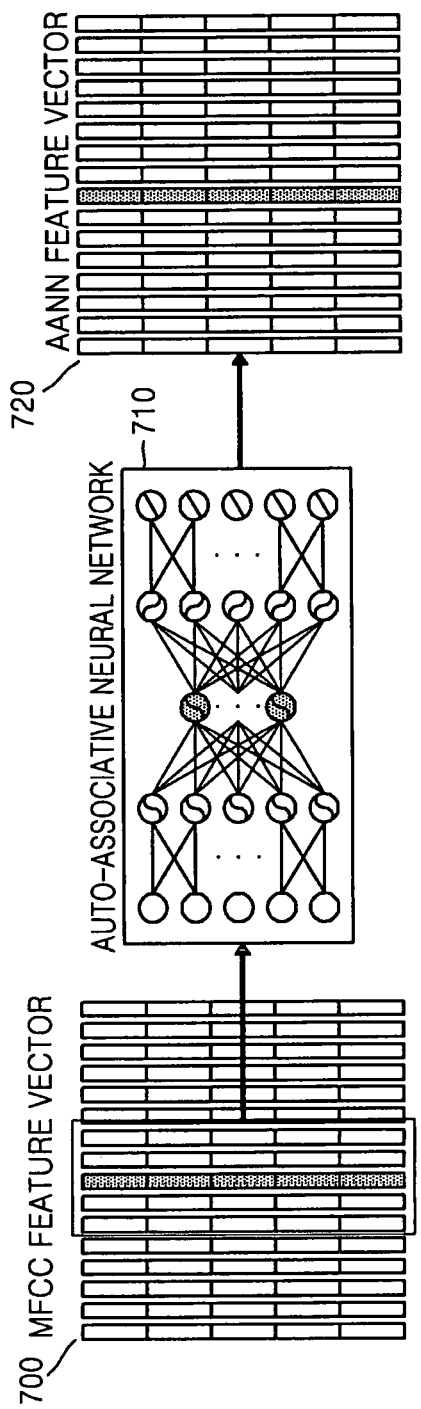
FIG. 7 is a view for explaining AANN transformation of feature vectors for multiple frames according to another exemplary embodiment of the present invention.

FIG. 7 is a view for explaining an AANN transformation of feature vectors for multiple frames according to another exemplary embodiment of the present invention.

Referring to FIG. 7, an MFCC feature vector 700, an AANN 710, and an AANN feature vector 720 are shown.

Although an MFCC feature vector for each band is used as an input to the AANN 710 in FIGS. 5 and 6, AANN transformation is performed for multiple frames in FIG. 7.

In FIG. 7, AANN transformation is not applied to each band. Instead, the MFCC feature vectors 700 of adjacent frames are used as input neurons to the AANN 710. At this time, when 5 frames are used, the AANN 710 has a 65-65-13-65-65 feature. In other words, the number of neurons in an intermediate hidden layer is 13.

The 13 output values of the intermediate hidden neuron layer are used as the AANN feature vector 720.

Figure 8:
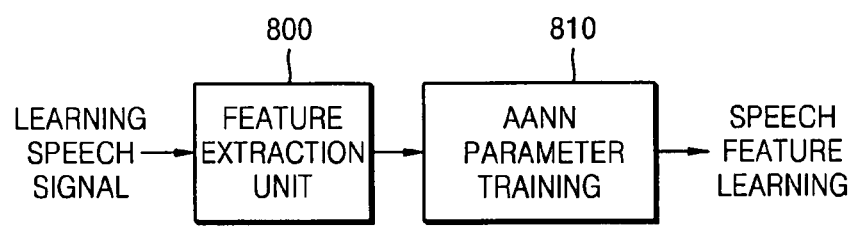
FIG. 8 is a block diagram of a configuration for learning a parameter of an AANN according to another exemplary embodiment of the present invention.

FIG. 8 is a block diagram of a configuration for learning a parameter of an AANN according to another exemplary embodiment of the present invention.

Referring to FIG. 8, learning of an AANN is made during a speech recognition training process.

Upon input of a learning speech signal, an MFCC feature extraction unit 800 extracts an MFCC feature vector and AANN parameter learning 810 is performed. Here, parameter learning may be performed using error back-propagation or resilient back-propagation.

Error back-propagation is a learning algorithm used in a multi-layered, feed-forward neural network and uses supervised learning. In other words, input data and desired output data are necessary for learning.

For learning, an output corresponding to an input is obtained by repeatedly multiplying the input by and adding the input to weights of a neural network. At this time, the output is not the same as the desired output given in learning data. As a result, an error occurs in the neural network. Thus, a weight of the output layer is updated in proportion to the error and then a weight of the next hidden layer is updated. Since the direction of weight update is opposite to the processing direction of the neural network, this algorithm is called back-propagation. In other words, the neural network performs processing in the order of the input layer, then the hidden layer, then the output layer, whereas the weight update is performed in the order of the output layer, then the hidden layer.

Resilient back-propagation is useful to solve an encoder-decoder problem like in an AANN and provides high-speed convergence and learning.

A learning equation of resilient back-propagation can be expressed as follows.

$$E(w[n]) = \frac{1}{2} \sum_i \sum_5 (t_i^5 - y_i^5(w[n]))^2 \quad (4)$$

$$w_{ij}[n] = w_{ij}[n-1] + \Delta w_{ij}[n]$$

Here, an error function is defined as a mean-squared error of neurons of the output layer to define a weight learning algorithm.

The weight update can be expressed as follows.

$$\Delta w_{ij}[n] = \begin{cases} -\Delta_{ij}[n], & \text{if } \frac{\partial E(w[n])}{\partial w_{ij}} > 0 \\ +\Delta_{ij}[n], & \text{if } \frac{\partial E(w[n])}{\partial w_{ij}} < 0 \\ 0, & \text{otherwise} \end{cases} \quad (5)$$

$$\Delta_{ij}[n] = \begin{cases} \eta^+ \Delta_{ij}[n], & \text{if } \frac{\partial E(w[n-1])}{\partial w_{ij}} \cdot \frac{\partial E(w[n])}{\partial w_{ij}} > 0 \\ \eta^- \Delta_{ij}[n], & \text{if } \frac{\partial E(w[n-1])}{\partial w_{ij}} \cdot \frac{\partial E(w[n])}{\partial w_{ij}} < 0 \\ \Delta_{ij}[n-1], & \text{otherwise} \end{cases} \quad (6)$$

In resilient back-propagation unlike in error back-propagation in which a weight is updated by being multiplied by both a partial differential value and a learning rate of the weight with respect to an error, a weight is updated with a constant value based on the current partial differential value and a previously repeated partial differential value.

In Equation 6, the condition $0 < \eta^- < 1 < \eta^+$ is satisfied.

Figure 9:
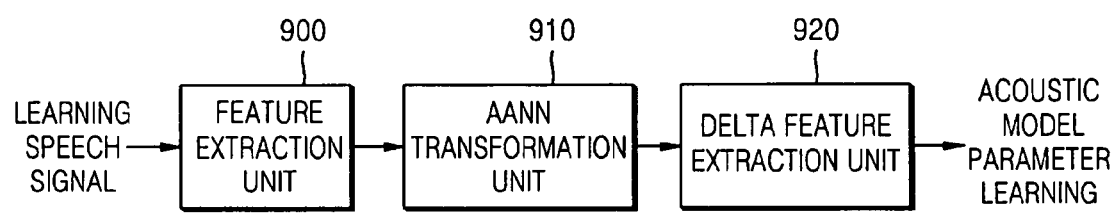
FIG. 9 is a block diagram of a configuration for learning a parameter of an acoustic model according to another exemplary embodiment of the present invention.

FIG. 9 is a block diagram of a configuration for learning a parameter of an acoustic model according to another exemplary embodiment of the present invention.

Referring to FIG. 9, an acoustic model learning process during a speech recognition training process is shown. Upon input of a learning speech signal, a feature extraction unit 900 performs MFCC feature extraction. An AANN transformation unit 910 performs AANN transformation using a learned AANN parameter. A delta feature extraction unit 920 extracts a delta feature vector AANN from the transformed feature, thereby generating a new AANN feature vector. A parameter of an acoustic model used in conventional speech recognition like a hidden Markov model (HMM) is learned using the generated AANN feature vector.

Here, the acoustic model stores information about in which form the speech signal can be expressed. The basic unit of the information is a phoneme or a phoneme likely unit. For example, the HMM is most widely used for speech recognition, in which on the assumption that a speech signal is generated by a Markov model, a parameter of the model is estimated during learning and a speech recognition apparatus searches for the best model for unknown input speech using the estimated parameter.

Figure 10:
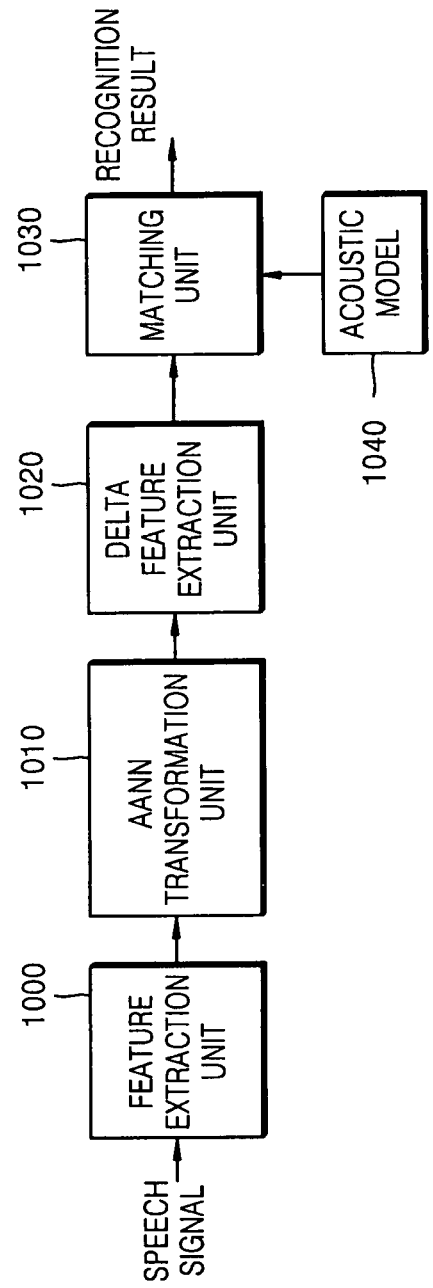
FIG. 10 is a block diagram of a speech recognition apparatus according to another exemplary embodiment of the present invention.

FIG. 10 is a block diagram of a speech recognition apparatus according to another exemplary embodiment of the present invention.

Referring to FIG. 10, the speech recognition apparatus includes a feature extraction unit 1000, an AANN transformation unit 1010, a delta feature reinforcement unit 1020, a matching unit 1030, and an acoustic model 1040.

In short, when a new speech signal is input, a recognition result is output using the AANN transformation unit 1010 having an AANN parameter that has been learned as in FIG. 8 and the acoustic model 1040 having a parameter that has been learned as in FIG. 9.

The matching unit 1030 matches a delta feature vector extracted from the transformed AANN feature vector with the acoustic model 1040 to output a result of speech recognition.

Figure 11:
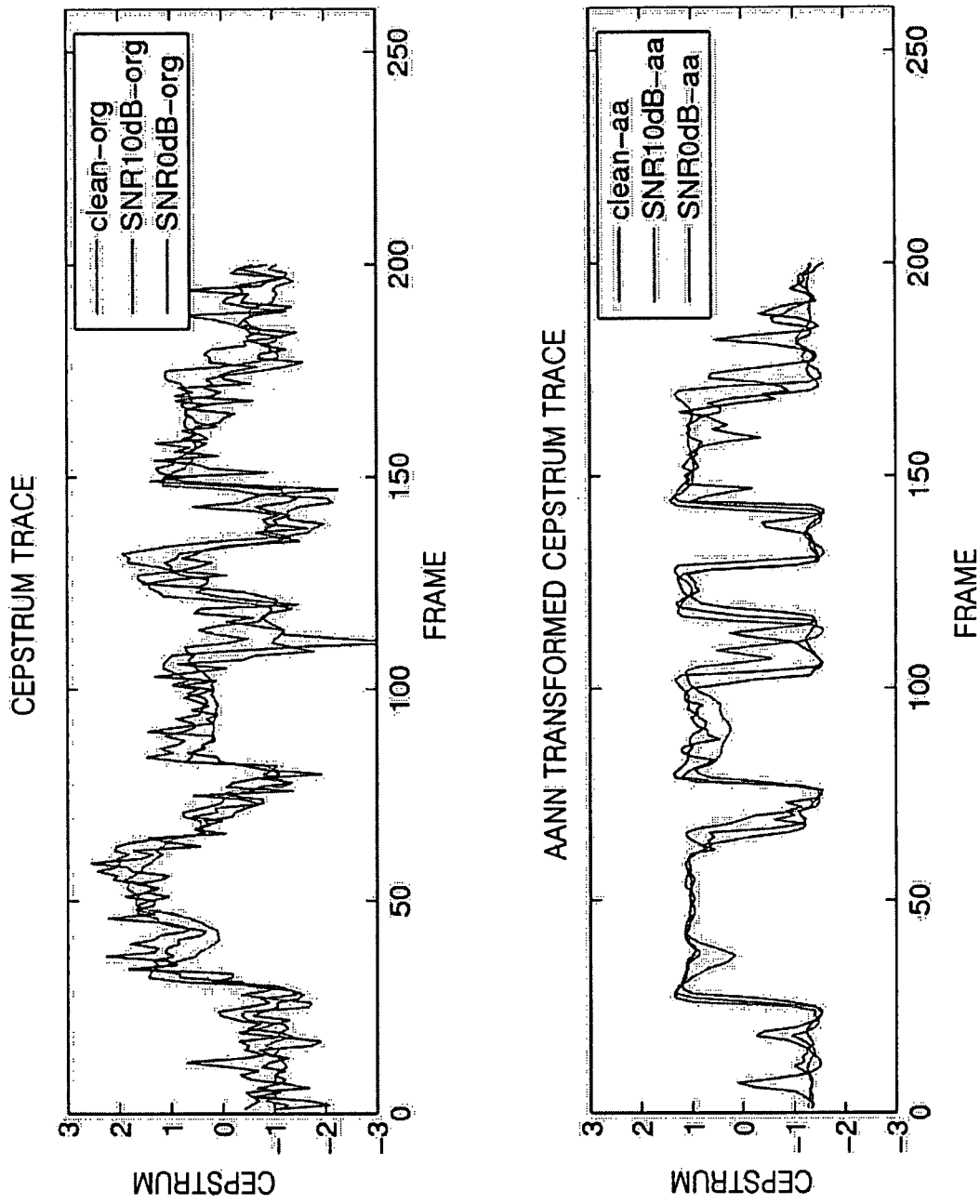
FIG. 11 illustrates a change in a cepstrum trace with the application of AANN transformation according to another exemplary embodiment of the present invention.

FIG. 11 illustrates a change in a cepstrum trace with the application of AANN transformation according to another exemplary embodiment of the present invention.

More specifically, a cepstrum trace before the application of a learned AANN for each band and a cepstrum trace after the application of the AANN are shown according to a time frame.

First, in the case of the cepstrum trace before the application of the AANN, the variableness of the cepstrum trace varies with a noise-free signal, a signal having a signal-to-noise ratio (SNR) of 10 dB, and a signal having a SNR of 0 dB, having a negative influence upon recognition performance.

In the case of the cepstrum trace after the application of the AANN according to an exemplary embodiment of the present invention, the cepstrum trace of a noise-free speech feature vector and the cepstrum trace of a noise-added speech feature vector are not much different from each other.

Figure 12:
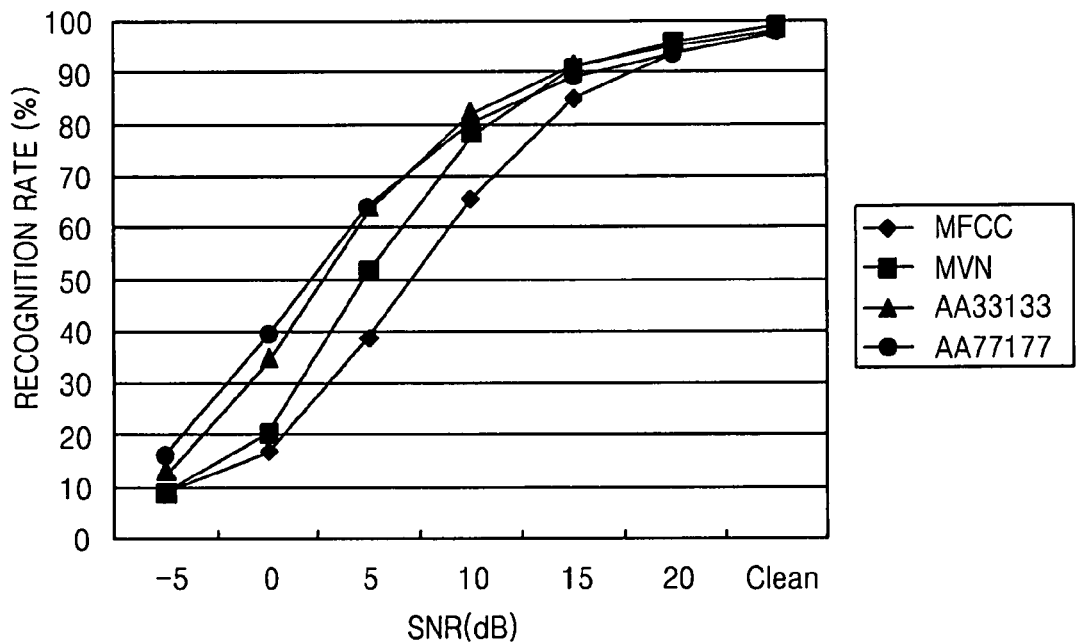
FIG. 12 is a graph for comparing recognition rates according to a signal-to-noise ratio (SNR) according to another exemplary embodiment of the present invention.
Figure 13:
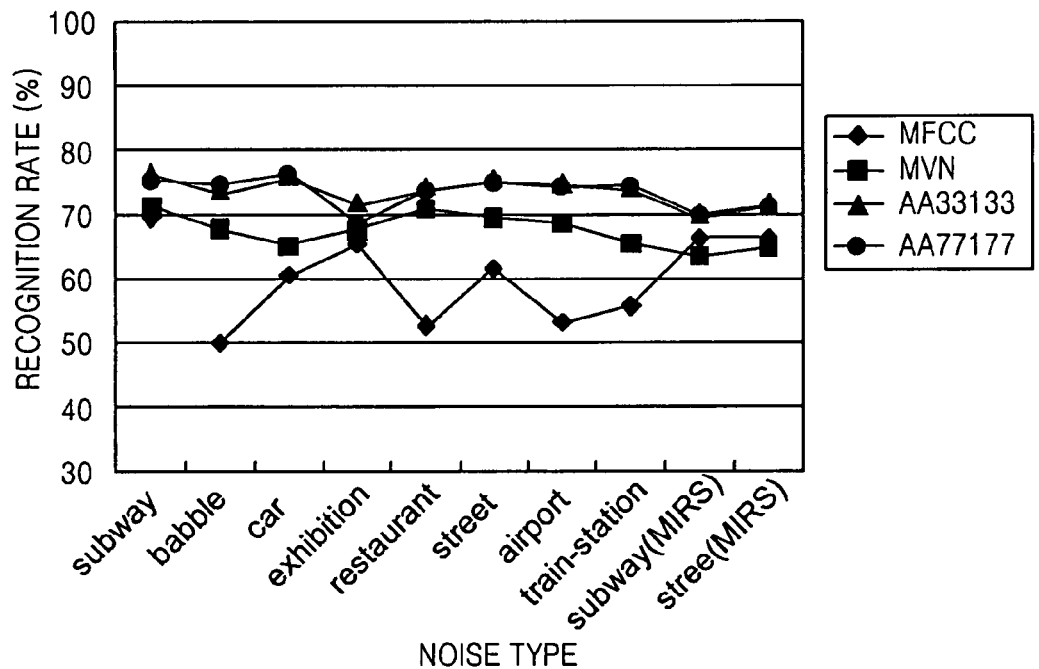
FIG. 13 is a graph for comparing recognition rates according to a noise type according to another exemplary embodiment of the present invention.

FIG. 12 is a graph for comparing recognition rates according to an SNR and FIG. 13 is a graph for comparing recognition rates according to a noise type.

An influence of feature vector transformation upon an actual recognition rate can be seen from FIG. 12. More specifically, recognition rates according to SNRs changing from −5 dB to 20 dB are shown and a database used in this experiment is the Aurora2 Project Database that is widely used as a benchmark of a noise environment.

The Aurora2 Project Database is made by mixing connected words, alphabets, numbers, and voice with various types of noise environments, such as a subway, a babble, a car, an exhibition, a restaurant, a street, an airport, and a trainstation, and noise of various amplitudes from 5dB to 20dB, and a word-based HMM model having 16 states per recognition word is used as a recognition apparatus.

It can be seen from FIG. 12 that the performance of recognition using a feature vector to which the AANN according to an exemplary embodiment of the present invention is applied is improved by up to 20% when compared to a conventional MVN in a highly noisy environment.

FIG. 13 shows a recognition result according to various types of noise. As can be seen from FIG. 13, a recognition rate increases after the application of the AANN according to an exemplary embodiment of the present invention and the variableness of a 7-7-1-7-7 AANN having an increased number of input neurons increases for each type of noise when compared to a 3-3-1-3-3 AANN.

The present invention can also be embodied as computer codes t on a computer-readable recording medium. The computer-readable recording medium may be all kinds of recording devices storing data that is readable by a computer system. Examples of the computer-readable recording medium include read-only memory (ROM), random access memory (RAM), CD-ROMs, magnetic tapes, floppy disks, optical data storage devices, and carrier waves such as transmission over the Internet.

As described above, according to the present invention, a feature vector required for speech recognition is extracted from a speech signal and the extracted feature vector is transformed using an AANN, thereby obtaining robust feature output values even when a speech feature vector including noise during speech recognition is input.

By using a feature vector for each frame as an output target value, the characteristics of a noise-free speech feature vector are included in neurons of an internal hidden layer, thereby reducing a possibility of an error in a recognition model.

Moreover, even when phonemic class information for each frame of a feature vector is not provided, a feature vector having a nonlinearly compressed time-frame characteristic can be obtained. In addition, self-learning is possible with the same input-output data unlike an algorithm that requires accurate phonemic information for each frame.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of transforming a speech feature vector, the method comprising:

(a) extracting a feature vector required for speech recognition from a speech signal; and (b) transforming, using a processor, the extracted feature vector using an auto-associative neural network (AANN), wherein (b) comprises:

inputting a frame value of the extracted feature vector to the AANN;

extracting output values of a hidden layer of the AANN;

calculating an average of the extracted output values of the hidden layer or calculating a maximum value among the extracted output values of the hidden layer; and generating the transformed feature vector using the average of or the maximum value among the extracted output values.

2. The method of claim 1, further comprising:

setting a frame value of the extracted feature vector as an input value and an output value of the AANN; and learning the AANN based on the set input value and output value.

3. The method of claim 1, wherein (b) comprises inputting the value of a frame of the extracted feature vector for each frequency band and values of frames adjacent to the frame to the AANN.

4. The method of claim 1, wherein (b) comprises inputting the value of a frame of the extracted feature vector and values of frames adjacent to the frame to the AANN.

5. The method of claim 1, wherein at least one neuron exists in a hidden layer of the AANN.

6. The method of claim 1, further comprising, after (b), (c) extracting a delta feature of the transformed feature vector.

7. The method of claim 1, further comprising, after (b), (c) extracting an acceleration feature of the transformed feature vector.

8. A method of transforming a speech feature vector, the method comprising:

extracting a feature vector required for speech recognition from a speech signal;

inputting the extracted feature vector and a feature vector of an adjacent frame of the extracted feature vector to an auto associative neural network (AANN);

extracting, using a processor, output values of a hidden layer of the AANN;

calculating an average of the extracted output values of the hidden layer or calculating a maximum value among the extracted output values of the hidden layer; and generating a transformed feature vector using the average of or the maximum value among the extracted output values.

9. A non-transitory computer-readable recording medium having recorded thereon a program to control at least one processing element to implement the method of claim 1 or 8.

10. An apparatus for transforming a speech feature vector, the apparatus comprising:

a processor;

a feature extraction unit extracting a feature vector required for speech recognition from a speech signal; and a feature transformation unit, implemented by the processor, transforming the extracted feature vector using an auto-associative neural network (AANN), wherein the transforming comprises:

inputting a frame value of the extracted feature vector to the AANN;

extracting output values of a hidden layer of the AANN;

calculating an average of the extracted output values of the hidden layer or calculating a maximum value among the extracted output values of the hidden layer; and generating the transformed feature vector using the average of or the maximum value among the extracted output values.

11. The apparatus of claim 10, wherein a hidden layer of the AANN includes at least one neuron.

12. The apparatus of claim 10, further comprising a delta feature extraction unit extracting a delta feature of the transformed feature vector.

13. The apparatus of claim 10, further comprising an acceleration feature extraction unit extracting an acceleration feature of the transformed feature vector.

14. The apparatus of claim 10, wherein the input to the AANN includes the value of a frame of the extracted feature vector for each frequency band and values of frames adjacent to the frame.

15. The apparatus of claim 10, wherein the input to the AANN includes the value of a frame of the extracted feature vector and values of frames adjacent to the frame.

* * * * *

UNITED STATES PATENT AND TRADEMARK OFFICE
CERTIFICATE OF CORRECTION

PATENT NO.         : 8,838,446 B2
APPLICATION NO.    : 11/896450
DATED              : September 16, 2014
INVENTOR(S)        : So-young Jeong et al.

It is certified that error appears in the above-identified patent and that said Letters Patent is hereby corrected as shown below:

On the Title Page, Page 2, Column 1, Item [56] (Other Publications), Line 10, Delete "Nelral" and insert -- Neural --, therefor.

On the Title Page, Page 2, Column 2, Item [56] (Other Publications), Line 25, Delete "Neura" and insert -- Neural --, therefor.

On the Title Page, Page 2, Column 1, Item [56] (Other Publications), Line 14, After "p. 8, 2004.*" insert new line 15 -- HERMANSKY, H. et al., *Temporal Patterns in ASR of Noisy Speech*, ICASSP, 1999, pp. 289-292 (4 pages) --, therefor.

In the Claims

Column 10, Line 41, In Claim 8, Delete "auto associative" and insert -- auto-associative --, therefor.

Signed and Sealed this
Sixth Day of January, 2015

Michelle K. Lee
*Deputy Director of the United States Patent and Trademark Office*